United States Patent
Ulrey et al.

(10) Patent No.: US 9,682,685 B2
(45) Date of Patent: Jun. 20, 2017

(54) METHODS AND SYSTEMS FOR CONDENSATION CONTROL

(71) Applicant: Ford Global Technologies, LLC, Dearborn, MI (US)

(72) Inventors: Joseph Norman Ulrey, Dearborn, MI (US); Ravi Gopal, Novi, MI (US); Sunil Katragadda, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 952 days.

(21) Appl. No.: 13/965,763

(22) Filed: Aug. 13, 2013

(65) Prior Publication Data

US 2015/0047374 A1    Feb. 19, 2015

(51) Int. Cl.
*B60S 1/02* (2006.01)
*B60H 1/00* (2006.01)
*B60H 1/06* (2006.01)

(52) U.S. Cl.
CPC .......... *B60S 1/023* (2013.01); *B60H 1/00314* (2013.01); *B60H 1/06* (2013.01)

(58) Field of Classification Search
CPC . B60S 1/023; B60S 1/026; B60H 1/06; B60H 1/08; B60H 1/10; B60H 1/00314; B60H 1/00321; B60H 1/00357; B60H 1/00421
USPC ...................... 62/79, 239; 454/121
See application file for complete search history.

(56) References Cited

U.S. PATENT DOCUMENTS

| | | |
|---|---|---|
| 3,614,259 A | 10/1971 | Neff |
| 4,351,154 A | 9/1982 | Richter |
| 4,389,845 A | 6/1983 | Koike |
| 4,443,153 A | 4/1984 | Dibelius |
| 4,544,326 A | 10/1985 | Nishiguchi et al. |
| 4,949,276 A | 8/1990 | Staroselsky et al. |
| 5,794,575 A * | 8/1998 | Sonnemann ....... B60H 1/00321 123/41.08 |
| 6,079,210 A | 6/2000 | Pintauro et al. |
| 6,381,973 B1 * | 5/2002 | Bhatti ................ B60H 1/00007 62/172 |
| 6,408,833 B1 | 6/2002 | Faletti |
| 6,565,479 B2 | 5/2003 | Fattic et al. |

(Continued)

FOREIGN PATENT DOCUMENTS

| | | |
|---|---|---|
| EP | 0435357 A1 | 7/1991 |
| EP | 2317111 A1 | 5/2001 |

(Continued)

OTHER PUBLICATIONS

Ulrey, Joseph Norman et al., "Methods and Systems for Boost Control," U.S. Appl. No. 13/965,901, filed Aug. 13, 2013, 54 pages.

(Continued)

*Primary Examiner* — Mohammad M Ali
(74) *Attorney, Agent, or Firm* — Julia Voutyras; McCoy Russell LLP

(57) ABSTRACT

Methods and systems are provided for reducing condensate accumulation at a charge air cooler (CAC) during cold ambient conditions. During defrosting conditions, an air conditioner may be operated to dehumidify a cabin space while heat is rejected into a cooling circuit. Warm coolant may be directed to a CAC bypassing a radiator to expedite CAC heating.

18 Claims, 4 Drawing Sheets

(56) References Cited

U.S. PATENT DOCUMENTS

| | | | |
|---|---|---|---|
| 6,681,171 B2 | 1/2004 | Rimnac et al. | |
| 6,725,847 B2 | 4/2004 | Brunemann et al. | |
| 6,796,134 B1* | 9/2004 | Bucknell | B60H 1/323 |
| | | | 123/542 |
| 6,983,596 B2 | 1/2006 | Frankenstein et al. | |
| 7,137,253 B2 | 11/2006 | Furman et al. | |
| 7,163,005 B2 | 1/2007 | Tussing et al. | |
| 7,455,136 B2* | 11/2008 | Pleune | B60K 11/04 |
| | | | 165/41 |
| 7,640,744 B2 | 1/2010 | Rollinger et al. | |
| 7,765,824 B2* | 8/2010 | Wong | B60H 1/3226 |
| | | | 62/133 |
| 8,161,746 B2 | 4/2012 | Ulrey et al. | |
| 8,267,069 B2 | 9/2012 | Hsia et al. | |
| 8,286,616 B2 | 10/2012 | Clarke et al. | |
| 8,287,233 B2 | 10/2012 | Chen | |
| 8,333,071 B2 | 12/2012 | Oakley et al. | |
| 2005/0035209 A1* | 2/2005 | Wooldridge | B60K 11/02 |
| | | | 237/12.3 R |
| 2006/0196182 A1 | 9/2006 | Kimoto et al. | |
| 2008/0163855 A1* | 7/2008 | Matthews | F02M 26/25 |
| | | | 123/568.12 |
| 2008/0202739 A1* | 8/2008 | Barfknecht | F28D 7/1692 |
| | | | 165/175 |
| 2009/0071150 A1 | 3/2009 | Joergl et al. | |
| 2010/0300413 A1* | 12/2010 | Ulrey | F02D 9/12 |
| | | | 123/518 |
| 2011/0023842 A1 | 2/2011 | Kurtz | |
| 2011/0094480 A1 | 4/2011 | Suhocki et al. | |
| 2011/0120432 A1* | 5/2011 | Ulrey | F02D 9/12 |
| | | | 123/568.15 |
| 2011/0146266 A1* | 6/2011 | Weinbrenner | F02B 29/0412 |
| | | | 60/599 |
| 2012/0014812 A1 | 1/2012 | Blaiklock et al. | |
| 2012/0017575 A1* | 1/2012 | Sloss | F01N 5/02 |
| | | | 60/320 |
| 2012/0097136 A1* | 4/2012 | Diem | F02B 29/0412 |
| | | | 123/542 |
| 2012/0297765 A1 | 11/2012 | Vigild et al. | |

FOREIGN PATENT DOCUMENTS

| | | |
|---|---|---|
| EP | 1124047 A1 | 8/2001 |
| EP | 2426340 A1 | 3/2012 |
| EP | 2562397 A1 | 8/2012 |

OTHER PUBLICATIONS

Banker, Adam Nathan et al., "Methods and Systems for Torque Control," U.S. Appl. No. 13/965,917, filed Aug. 13, 2013, 46 pages.

McConville, Gregory Patrick et al., "Methods and Systems for Boost Control," U.S. Appl. No. 13/965,938, filed Aug. 13, 2013, 40 pages.

Ulrey, Joseph Norman et al., "Methods and Systems for Boost Control," U.S. Appl. No. 13/965,952, filed Aug. 13, 2013, 40 pages.

Jankovic, Mrdjan J. et al., "Methods and Systems for Boost Control," U.S. Appl. No. 13/829,648, filed Mar. 14, 2013, 39 pages.

Styles, Daniel Joseph et al., "Methods and Systems for Boost Control," U.S. Appl. No. 13/965,698, filed Aug. 13, 2013, 43 pages.

Buckland Julia Helen et al., "Methods and Systems for Surge Control," U.S. Appl. No. 113/965,725, filed Aug. 13, 2013, 38 pages.

Ulrey, Joseph Norman et al., "Methods and Systems for Condensation Control," U.S. Appl. No. 13/965,751, filed Aug. 13, 2013, 36 pages.

Ulrey, Joseph Norman et al., "Methods and Systems for EGR Control," U.S. Appl. No. 13/965,794, filed Aug. 13, 2013, 56 pages.

McConville, Gregory Patrick et al., "Methods and Systems for Boost Control," U.S. Appl. No. 13/965,963, filed Aug. 13, 2013, 45 pages.

Ulrey, Joseph Norman et al., "Methods and Systems for EGR Control," U.S. Appl. No. 13/966,006, filed Aug. 13, 2013, 56 pages.

Byrd, Kevin Durand et al., "Multi-Staged Wastegate," U.S. Appl. No. 13/570,025, filed Aug. 8, 2012, 26 pages.

Ulrey, Joseph Norman et al., "Methods and Systems for Fuel Vapor Management," U.S. Appl. No. 13/660,884, filed Oct. 25, 2012, 38 pages.

* cited by examiner

METHODS AND SYSTEMS FOR CONDENSATION CONTROL

FIELD

The present application relates to methods and systems for using heat from an air conditioning system to expedite heating of a charge air cooler.

BACKGROUND AND SUMMARY

Vehicles may be configured with defrosting systems to clear condensation and/or thaw frost from the windshield, back window, and/or side windows of the vehicle. Defrosting systems may include components, such as blowers and fans that are shared with a vehicle heating ventilation and air conditioning (HVAC) system and an engine cooling circuit. For primary defrosting, heat is provided by the vehicle's engine coolant via the heater core. Specifically, fresh air is blown through the heater core and then ducted to and distributed over the interior surface of the windshield by a blower. In addition to fans and blowers of the HVAC system, an air conditioner may also be operated during defrosting to dehumidify the air blown by the fans and blowers. The dehumidification makes the defrosting more effective and faster since dried air has a greater capacity to absorb water from the glass at which it is directed. Secondary defrosting, often used on the back and/or side mirrors, typically consists of multiple resistive conductors embedded in or on the glass. When power is applied, these conductors heat up, thawing ice and evaporating condensation from the glass.

The inventors herein have recognized potential opportunities with the defrosting mode. As an example, the engagement of the air conditioner to dehumidify the cabin air results in condenser heat being rejected to the atmosphere during cold ambient conditions. This heat is lost to the environment without being used. The inventors have recognized that this heat can be harnessed instead of being lost to the environment. Cold ambient conditions can also overcool the refrigerant (or coolant) in the cooling circuit and create freezing concerns. Since the defrosting mode requires hot air that has been heated via the engine cooling circuit, efficient defrosting may be delayed until the engine has sufficiently warmed. Ironically, since engine heat is sent to the cabin to heat the cool air, engine warm-up during defrosting may be slower than when defrosting is not required. Further still, during the defrosting mode, ambient conditions are the same as conditions where charge air cooler condensation is a large concern on boosted engines. When condensation accumulates in the intake system the potential for engine misfires and NVH issues increases.

The inventors herein have recognized that the heat generated at the HVAC system during a defrosting mode can be advantageously used during an engine cold-start to expedite warming of the charge air cooler and the engine. In one example, this may be achieved by a method for an engine comprising: responsive to a vehicle defrost condition, operating an air conditioner, and rejecting heat from a first cooling circuit to engine intake air, the first cooling circuit coupled to the air conditioner, a charge air cooler, and a radiator, the first cooling circuit not coupled to the engine. In this way, while the air conditioner is engaged to dehumidify the cabin during defrosting, the heat rejected by the air conditioner is advantageously used to expedite warming of the engine and the charge air cooler.

For example, an engine system may include a first cooling circuit coupled to an air conditioner (or HVAC system), a charge air cooler, a first coolant pump, and a radiator. The radiator may be coupled to the remaining components of the first cooling circuit via a thermostat valve such that when temperature of coolant flowing through the first cooling circuit is lower than a threshold, the thermostat valve remains closed and coolant flows through the circuit while bypassing the radiator. Then, when coolant temperature is above the threshold, the thermostat valve opens to allow coolant to flow through the radiator. As such, the first cooling circuit may constitute a low temperature loop. A second, different cooling circuit may include the engine and a fan, the second circuit constituting a high temperature loop. During vehicle defrosting conditions, the air conditioner (AC) may be operated to dehumidify the cabin air. Heat absorbed from the evaporator from the condensing cabin moisture during dehumidification is rejected to the water cooled AC condenser in the low temperature cooling circuit thereby warming the coolant. The first coolant pump may be operated to flow warmed coolant in the first cooling circuit through the AC (where heat is picked up) and then through a charge air cooler (CAC) while bypassing the radiator. By bypassing the low temperature radiator, no heat is lost to the atmosphere and the warm coolant is able to warm the CAC. The warm CAC in turn warms the aircharge flowing there-through. Once the coolant in the first cooling circuit is sufficiently hot (e.g., above a threshold), the thermostat valve may open and coolant may be pumped around the first cooling circuit through the radiator, allowing heat to be lost to the environment, and enabling temperature control of the first cooling circuit.

Expedited heating of the CAC provides multiple benefits. First, it expedites engine warm-up by heating the intake aircharge received in the engine, which in turn improves the efficiency of defrosting. Second, by increasing the temperature at the CAC, condensation issues at the CAC are reduced. In addition, low pressure EGR can be introduced earlier without condensation concerns. As such, once EGR is introduced, heat rejected by the EGR cooler into the second cooling circuit further expedites engine warm-up. In this way, defrost heat may be recovered and added to a CAC during cold ambient conditions to expedite warming of the CAC and engine. By operating the engine with warmer air, particulate matter (PM), CO and hydrocarbon (HC) emissions are reduced, and by extending the range of EGR operation, fuel economy benefits are also achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
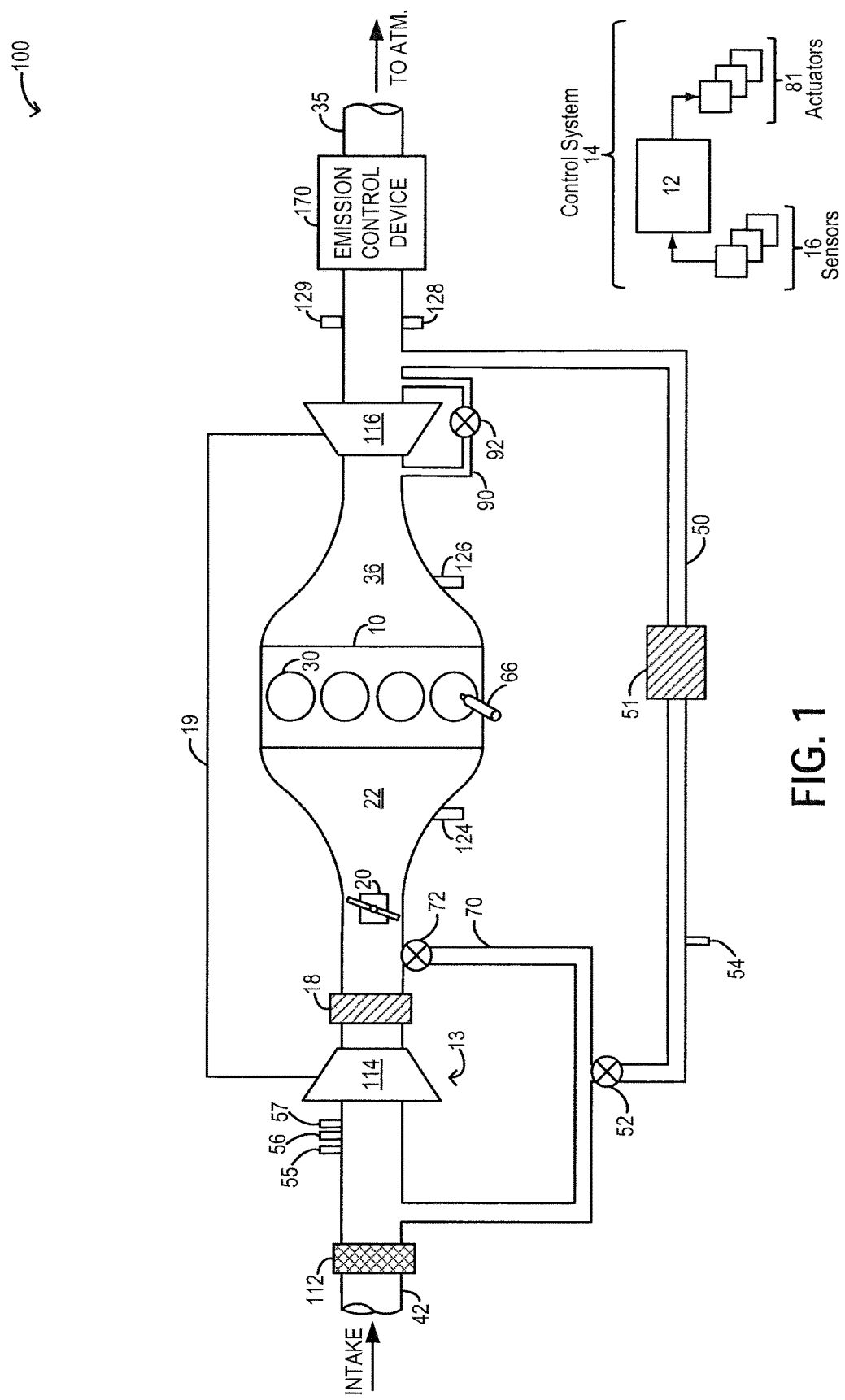
FIG. 1 shows an example embodiment of a boosted engine system.

Methods and systems are provided for recovering heat from an air conditioning system coupled to an engine, such as the engine system of FIG. 1, to warm charge flowing through a charge air cooler (CAC). In doing so, intake aircharge and coolant flowing though the charge air cooler's cooling circuit (such as the circuit of FIG. 2), can be warmed. An engine controller may be configured to perform a control routine, such as the routine of FIG. 3, to recover defrost heat by circulating coolant through a CAC bypassing a radiator during cold conditions. EGR delivery may be initiated once the CAC has been sufficiently warmed. An example adjustment is shown with reference to FIG. 4.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 114 is coupled, through charge-air cooler (CAC) 18 (herein also referred to as an intercooler) to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-air heat exchanger, for example. A detailed description of the cooling circuit coupled to the CAC is provided below with reference to FIG. 2. In the embodiment shown in FIG. 1, the pressure of the air charge within the intake manifold is sensed by manifold air pressure (MAP) sensor 124. Since flow through the compressor can heat the compressed air, a downstream CAC 18 is provided so that boosted intake aircharge can be cooled prior to delivery to the engine intake.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when EGR is enabled, the sensors may estimate a temperature, pressure, humidity, and air-fuel ratio of the aircharge mixture including fresh air, recirculated compressed air, and exhaust residuals received at the compressor inlet.

During selected conditions, such as during a tip-out, when going from engine operation with boost to engine operation without boost, compressor surge can occur. This is due to an increased pressure differential being generated across the compressor when the throttle closes at the tip-out. The increased pressure differential reduces forward flow through the compressor, causing surge and degraded turbocharger performance. In addition, surge can lead to NVH issues such as undesirable noise from the engine intake system. To relieve boost pressure and reduce compressor surge, at least a portion of the aircharge compressed by compressor 114 may be recirculated to the compressor inlet. This allows excess boost pressure to be substantially immediately relieved. The compressor recirculation system may include a compressor recirculation passage 70 for recirculating cooled compressed air from the compressor outlet, downstream of charge-air cooler 18 to the compressor inlet. In some embodiments, an additional compressor recirculation passage (not shown) may be provided for recirculating un-cooled (or warm) compressed air from the compressor outlet, upstream of charge-air cooler 18 to the compressor inlet.

A compressor recirculation valve (CRV) 72 may be coupled to compressor recirculation passage 70 (also referred to as compressor bypass) to control an amount of cooled compressor flow recirculated to the compressor inlet. In the depicted example, CRV 72 may be configured as a continuously variable valve wherein a position of the valve is continuously variable from a fully closed position to a fully open position and any position there-between. CRV 72 may be positioned in passage 70, downstream of CAC 18 and upstream of an inlet of compressor 114. A position of CRV 72 may be adjusted during boosted engine operation to improve peak performance and provide a margin to surge. In one example, the CRV may be maintained closed during boosted engine operation to improve boost response and peak performance. In another example, the CRV may be maintained partially open during boosted engine operation so as to provide some surge margin, in particular, an improved margin to soft surge. In either case, in response to an indication of surge (e.g., hard surge), the opening of the valve may be increased. A degree of opening of the CRV may be based on the indication of surge (e.g., the compressor ratio, the compressor flow rate, a pressure differential across the compressor, etc.). As one example, an opening of the CRV may be increased (e.g., the valve may be shifted from the fully-closed position or partially-open position to a fully-open position) in response to an indication of surge.

Surge may also be relieved by reducing exhaust pressure at turbine 116. For example, a wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge. However, due to the boost dynamics of the wastegate, the effects of compressor recirculation valve adjustments on reducing surge may be faster than the effects of the wastegate adjustments.

Engine system 100 may further include an air conditioning (AC) system, for example, as part of a vehicle HVAC system. The AC system may be engaged or operated in response to an operator request for vehicle cabin cooling, dehumidification of cabin air, and/or for defrosting. As elaborated herein, during cold conditions when the AC system is engaged, heat generated by AC system operation (at an AC system condenser) may be rejected into a (first) cooling circuit coupled to the CAC, the HVAC system, and a radiator, but not coupled to the engine manifold or an EGR cooler. The presence of a thermostat valve that is closed during cold conditions forces coolant flow to be directed away from a radiator decreasing heat loss to the ambient air and increasing heat rejection from the AC system into the coolant. This expedites warming of intake aircharge flowing through the CAC while also warming the CAC. By simultaneously opening CRV 72, the heated aircharge can be recirculated around the compressor and the CAC, thereby further warming the CAC. The increased aircharge temperature and increased recirculation of heated aircharge around the compressor leads to increased heat rejection at the CAC. As such, this expedites CAC and engine warming and improves engine performance.

The thermostat valve may be opened once the CAC is sufficiently hot. As a result, during hot coolant conditions, coolant is directed through the radiator increasing heat loss to the ambient air. This expedites cooling circuit and CAC temperature control and reduces overheating.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, a portion of the exhaust residuals may be diverted instead to EGR passage 50, through EGR cooler 51 and EGR valve 52, to the inlet of compressor 114. As such, EGR passage 50 couples the engine exhaust manifold, downstream of the turbine 116, with the engine intake manifold, upstream of compressor 114. In the depicted example, EGR passage 50 is shown merging with compressor recirculation passage 70 upstream of the compressor inlet. It will be appreciated that in alternate examples, the passages may not merge and the EGR passage may be coupled to the compressor inlet independent of the compressor recirculation passage.

EGR valve 52 may be opened to admit a controlled amount of cooled exhaust gas to the compressor inlet for desirable combustion and emissions-control performance. In this way, engine system 10 is adapted to provide external, low-pressure (LP) EGR by tapping exhaust gas from downstream of turbine 116. EGR valve 52 may also be configured as a continuously variable valve. In an alternate example, however, EGR valve 52 may be configured as an on/off valve. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

EGR cooler 51 may be coupled to EGR passage 50 for cooling EGR delivered to the compressor. In addition, one or more sensors may be coupled to EGR passage 50 for providing details regarding the composition and condition of the EGR. For example, a temperature sensor may be provided for determining a temperature of the EGR, a pressure sensor may be provided for determining a temperature of the EGR, a humidity sensor may be provided for determining a humidity or water content of the EGR, and an air-fuel ratio sensor 54 may be provided for estimating an air-fuel ratio of the EGR. Alternatively, EGR conditions may be inferred by the one or more temperature, pressure, humidity and air-fuel ratio sensors 55-57 coupled to the compressor inlet. An opening of the EGR valve may be adjusted based on the engine operating conditions and the EGR conditions to provide a desired amount of engine dilution.

During cold CAC conditions, such as during an engine cold-start or when ambient conditions are cold, EGR received at the pre-compressor location may generate condensation due to the relatively high water content of EGR. When ingested in the engine, the condensate can lead to misfire events and NVH issues. As elaborated with reference to FIG. 3, during such conditions, the delivery of low pressure EGR may be delayed until the CAC has been sufficiently warmed. In addition, warming of the CAC may be expedited by recovering defrost heat generated at the condenser of an air conditioning system. In doing so, EGR can be provided even during low ambient conditions, extending the operating range over which EGR benefits can be attained.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, compressor recirculation valve 72, wastegate 92, and fuel injector 66. The control system 14 may include a controller 12. The controller may receive input data from the various sensors, process the input data, and trigger various actuators in response to the processed input data based on instruction or code programmed therein corresponding to one or more routines. An example control routine is described herein with regard to FIG. 3.

Figure 2:
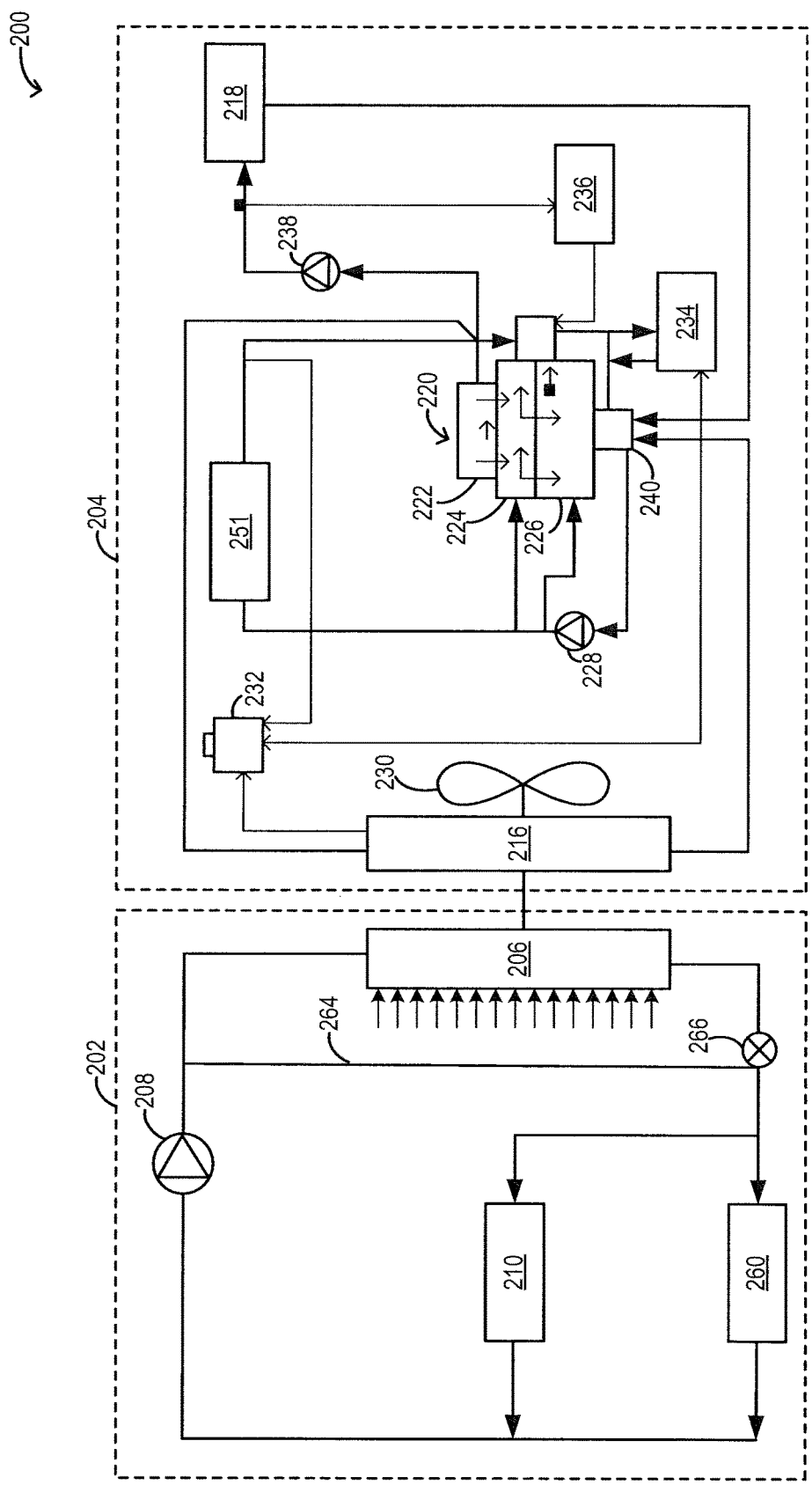
FIG. 2 shows an example embodiment of a cooling circuit coupled to the engine system of FIG. 1.

Now turning to FIG. 2, an example cooling system 200 coupled to the engine of FIG. 1 is shown. As such, the engine may be coupled to a passenger vehicle or other road vehicle. The cooling system enables defrost heat recovered from operation in a defrost mode to be passed on to a CAC so as to expedite engine heating. Specifically, flow through the warmed CAC is used heat the aircharge, while in turn heats the engine, improving engine performance during cold conditions.

Cooling system 200 includes a first cooling circuit 202 and a second cooling circuit 204, each coupled to different sets of engine system components. First cooling circuit 202 includes radiator 206, coolant pump 208, a water-air charge air cooler (CAC) 210, and AC system condenser 260. As such, the first cooling circuit constitutes a low temperature circuit. AC system condenser 260 may be coupled to an air conditioning system that is part of a larger vehicle HVAC system. During conditions when the AC system is engaged, such as during a request for cabin cooling for defrosting, coolant pump 208 may be operated to flow coolant through the condenser (where heat is rejected from the condenser to the coolant). As such, coolant pump 208 may be operated as long as the AC system is engaged.

Second cooling circuit 204 includes radiator 216, coolant pumps 228, 238, EGR cooler 251, oil cooler 234, turbocharger 236, heater core 218 and constitutes a high temperature circuit.

Returning to first cooling circuit 202, coolant pump 208 is configured to pump hot coolant received from condenser 260 and CAC 210 into radiator 206 so that heat can be rejected to the environment. Specifically, ambient air (depicted by small arrows entering radiator 206) may flow through radiator 206, picking up heat rejected at the radiator. CAC 210 may be configured to cool compressed intake aircharge received from a compressor before the aircharge is delivered to the engine intake. During boosted engine operation, intake air compressed at a compressor is delivered to the engine upon passage through the CAC (such as CAC 18 of FIG. 1). Heat from the air is rejected into coolant flowing the CAC.

First cooling circuit includes a thermostat valve 266 coupled between radiator 206 and each of AC system condenser 260 and CAC 210 such that when it is exposed to cool coolant (such as during cold engine, cold CAC or cold ambient conditions), the thermostat valve is closed. When closed, coolant pump 208 operation forces coolant along bypass 264 and diverts coolant away from radiator 206. In comparison, when the valve is exposed to hot coolant, the thermostat valve is opened. When open, coolant pump 208 operation flows coolant through radiator 206. Thus, the coolant pump output goes to both the AC condenser and the CAC, and the output of both the AC condenser and the CAC mixes at the inlet of the pump. As a result, when the engine is not boosted, hotter coolant comes out of the condenser and colder coolant would come out of the CAC to be mixed into warm coolant at the pump inlet. If it is warm enough, it will cause the thermostat valve to open As elaborated herein, during cold CAC conditions, the AC system may be engaged, for example in response to a defrosting request (to dehumidify the vehicle cabin) or a cabin cooling request (to cool the cabin). When the AC system is engaged, coolant pump 208 may be operated. Also, while the AC system is engaged, heat from the cabin is rejected into the first cooling circuit via the condenser 260. During cold conditions when the AC system is engaged, and the thermostat valve is closed, the heat rejected by the condensers into the cooling circuit is advantageously circulated through CAC 210 to warm the intake aircharge and the CAC. Specifically, during these conditions, by diverting coolant flow through bypass 264, while thermostat valve 266 is closed, heat loss to the environment is reduced. Instead, defrost heating is used to expedite CAC heating. When the coolant temperature rises above a threshold, the thermostat valve is opened. If the AC system is still engaged, heat is rejected by the condenser into the cooling circuit and circulated through radiator 206 to lose heat to the environment and maintain a temperature of the cooling circuit within a desired threshold or range.

Second cooling circuit 204 is a traditional coolant loop and circulates coolant through internal combustion engine 220 to absorb waste engine heat and distribute the heated coolant to radiator 216 and/or heater core 218. Radiator 216 may include a radiator fan 230 to improve the efficiency of cooling. The second cooling circuit also circulates coolant through EGR cooler 251 coupled to the EGR system (of FIG. 1). Specifically, exhaust heat is rejected at EGR cooler 251 during EGR delivery. The second cooling circuit also circulates coolant through and receives heat rejected from engine oil cooler 234 and turbocharger 230.

Engine-driven water pump 228 circulates coolant through passages in engine 220, specifically, through the intake and exhaust manifolds 222, through engine head 224 and then through engine block 226 to absorb engine heat. From the engine, coolant flows back to the engine upon passage through EGR cooler 251 and radiator 216. Heat is transferred via radiator 216 and fan 230 to ambient air. Thus, during conditions when EGR is delivered, heat rejected at EGR cooler 251 can be circulated through engine 220 and advantageously used to warm the engine, such as during cold ambient conditions. Engine-driven water pump 228 may be coupled to the engine via a front end accessory drive (FEAD, not shown), and rotated in proportion with engine speed via a belt, chain, etc. In one example, where pump 228 is a centrifugal pump, the pressure (and resulting flow) produced may be proportional to the crankshaft speed, which in the example of FIG. 2, is directly proportional to engine speed. An auxiliary pump 238 may also be included in second cooling circuit 204 to assist coolant flow through the GR system and the turbocharger. The temperature of the coolant may be regulated by a thermostat valve 240 which may be kept closed until the coolant reaches a threshold temperature.

Fan 230 may be coupled to radiator 216 in order to maintain an airflow through radiator 216 when the vehicle is moving slowly or stopped while the engine is running. In some examples, fan speed may be controlled by a controller. Alternatively, fan 230 may be coupled to engine-driven water pump 228.

Hot coolant may also flow to heater core 218 via an auxiliary pump 238. Auxiliary pump 238 may be employed to circulate coolant through heater core 218 during occasions when engine 220 is off (e.g., electric only operation) and/or to assist engine-driven pump 228 when the engine is running. Like engine-driven pump 228, the auxiliary pump may be a centrifugal pump; however, the pressure (and resulting flow) produced by the auxiliary pump may be proportional to an amount of power supplied to the pump by a system energy storage device (not shown).

At the heater core, heat may be transferred to a vehicle passenger compartment. The coolant then flows back to engine 10. Heater core 218 may thus act as a heat exchanger between the coolant and the passenger compartment. Fins may be attached to the heater core to increase the surface area for heat transfer. Air may be forced past the fins, for example by operating a fan, to expedite heating of the passenger compartment. Degas bottle 232 is located at a high point in the cooling circuit 204 and is configured to purge air from the coolant. It will be appreciated that in the embodiment of FIG. 2, the smaller hoses of the cooling circuit are depicted by the thinner lines while the larger hoses are indicated by the thicker lines. Now turning to FIG. 3, an example method 300 for using defrost heating to heat an engine air intake aircharge, and thereby a charge air cooler and an engine, during cold conditions is shown. By recovering defrosting heat and using it to expedite warming of the CAC, EGR benefits can be delivered even during cold ambient conditions.

At 302, the routine includes estimating and/or measuring engine operating conditions such as engine speed, engine coolant temperature, barometric pressure, ambient temperature and humidity, MAP, MAF, MAT, torque demand, etc.

At 304, it may be determined if the AC compressor is on. For example, it may be determined if vehicle defrost conditions are present and/or if a cabin cooling request has been made. In one example, vehicle defrost conditions may overlap with cold engine conditions, such as when one or more of cold ambient conditions (e.g., where ambient temperature is below a threshold), cold engine conditions (e.g., where engine coolant temperature is below a threshold), and cold CAC conditions (e.g., where CAC temperature is below a threshold) are present. During vehicle defrost conditions, condensation may accumulate on vehicle windows and windshields, reducing vehicle visibility. During such conditions, an air conditioning system (e.g., an air conditioner of the vehicle HVAC system) may be engaged and operated for dehumidifying the air. By dehumidifying the air, the efficiency of fans and blowers used for removing condensation is improved. Alternatively, it may be determined if cabin cooling conditions are present, such as when a vehicle operator request cabin temperature control. As such, in response to a cabin cooling request, the air conditioning system may be engaged and operated for cabin cooling. Thus, at 302, it may be determined if cold conditions are present and the air conditioning system has been engaged.

If the AC compressor is on, the routine moves to 312 to operate the coolant pump to circulate coolant through the AC condenser. As such, during this time, the thermostat valve may be closed so that the coolant pump is operated to flow coolant through the AC condenser and the bypass, but not through the radiator.

If the AC compressor is not on, then at 308, it may be determined if the CAC temperature (T_CAC) is higher than a threshold. For example, it may be determined if the CAC is at least 5° C. above the ambient temperature. Alternatively, or additionally, it may be determined if the CAC is above 25° C. If yes, the routine proceeds to 312 to operate the coolant pump and circulate coolant through the AC condenser while bypassing the radiator. If the AC compressor is not on and the CAC temperature is not higher than the threshold temperature, then at 310, the routine includes not operating the coolant pump.

As mentioned above, at 312, the routine includes operating a coolant pump of the first cooling circuit to flow coolant through the air conditioning system, and then to the charge air cooler via a bypass not including the radiator. As such, during the defrost condition, while a temperature of coolant in the first cooling circuit is lower than a threshold, a thermostat valve coupled between the air conditioning system and the radiator is in a closed position. Thus, when the coolant pump is operated, coolant is circulated through the air conditioning system, and the CAC without flowing through the radiator.

At 314, the routine includes rejecting heat into the first cooling circuit (such as cooling circuit 202 of FIG. 2) while bypassing the radiator. In particular, heat is transferred from the air conditioning system to the charge air cooler via the coolant and from the charge air cooler to engine intake aircharge during engine operation. Therein, heat is rejected by a condenser of the AC system into the cooling circuit to warm up the coolant. When the warm coolant then flows through the CAC, it leads to warming of the CAC as well as intake aircharge flowing through the CAC. This allows CAC warming during cold conditions to be expedited. The flow of heated intake aircharge to the engine also expedites engine warm-up. In this way, the CAC may be opportunistically warmed using defrost heating.

Optionally, while rejecting heat into the first cooling circuit, a compressor recirculation valve coupled across an intake compressor may be opened to recirculate heated intake aircharge across the compressor. By simultaneously opening the CRV while rejecting defrosting heat into the first cooling circuit, the heated aircharge can be recirculated around the compressor and the CAC, thereby warming the CAC. In addition, by increasing the recirculation of heated air across the CAC (via the CRV), heat transfer to the CAC and the CAC cooling circuit is increased without incurring a substantial increase in throttle inlet pressure.

Optionally, at 316, if EGR was requested (at 302), the routine includes closing the EGR valve (or holding the EGR valve closed) and delaying EGR delivery until sufficient CAC warming has occurred. In one example, where the EGR valve is a continuously variable valve, this may include decreasing an opening of the EGR valve. In an alternate example, where the EGR valve is an on/off valve, the EGR valve may be shifted to the closed or off position to enable EGR delivery. As such, closing the EGR valve includes providing no exhaust gas recirculation. As elaborated below, the engine controller may hold the EGR valve closed until a coolant temperature (or CAC temperature) is above a threshold. By delaying the delivery of EGR until CAC temperatures are sufficiently warm, condensation issues are reduced.

Defrost heating of the intake aircharge may be opportunistically performed until the CAC has been sufficiently warmed, or defrosting conditions are over. That is, defrost heating may be continued as long as the AC system is engaged and the AC compressor is on. At 318, it may be determined if the CAC temperature is higher than a threshold temperature. The threshold may be based on one or more of ambient humidity, ambient temperature, and CAC temperature. For example, as the ambient humidity increases, the threshold temperature may be increased. The threshold temperature may be further based on a coolant temperature of the first cooling circuit coupled to the CAC. In one example, the threshold temperature is 25° C.

Since CAC temperature may be inferred from coolant temperature estimated upstream of the CAC, in an alternate example, at 318, it may be determined if the coolant temperature is above the threshold. Further still, defrost heating may be continued for a duration until a compressor temperature is above a threshold temperature. The compressor temperature may include a compressor inlet temperature, or a compressor outlet temperature. In one example, a temperature sensor may be coupled to the cooling circuit upstream of the CAC to estimate a compressor, coolant, or CAC temperature. Alternatively, a temperature sensor may be coupled to the CAC inlet or outlet to estimate a compressor temperature.

As such, the indirect heating of the engine coolant as well the direct heating of the intake aircharge via the defrost heating can also improve the performance of a system heater as well as cold start exhaust emissions. In particular, hydrocarbon or soot emissions may be reduced. At 320, upon confirming that coolant temperature is above the threshold, the routine includes opening the thermostat valve. Specifically, heat may be rejected from the air conditioning system to atmosphere. As such, when coolant (or CAC) temperature is above the threshold, the thermostat valve may be in an open position. During this condition, coolant may be able to flow through the radiator. Thus, the controller may operate the coolant pump to flow coolant through the air conditioning system, the charge air cooler, and the radiator. As warm coolant flows through the radiator, heat generated at the AC system condenser can be rejected to the environment, allowing for temperature control of the first cooling circuit components. For example, the CAC may be kept at or below 25-30° C. Alternatively, the temperature may be kept just above ambient as the outside temperature increases.

Optionally, at 322, if EGR conditions are met and EGR was requested, the routine may also include opening the EGR valve to enable delivery of LP-EGR. By opening the EGR valve, recirculation of exhaust gas may be enabled from downstream of the exhaust turbine to the compressor inlet via an EGR passage and an EGR cooler positioned upstream of the EGR valve. The opening of the EGR valve may be adjusted based on the EGR amount or flow rate desired. As such, once EGR is enabled, heat is rejected from the EGR cooler to a second, different cooling circuit. The second cooling circuit may be coupled to the EGR cooler and further coupled to the engine but not coupled to the CAC (such as cooling circuit 204 of FIG. 2). This heat rejection allows engine temperatures to be further increased during engine cold starts. Thus, when the coolant temperature reaches the threshold, the controller may open the EGR valve to recirculate exhaust gas from the engine exhaust to the engine intake via the EGR passage, and reject heat from the EGR cooler into the second cooling circuit to warm the engine.

In this way, heat is added to a CAC cooling circuit and compressor inlet via energy recovered from an AC system condenser. Energy recovered from defrosting is transferred via the compressor to the inlet air. By adding heat to coolant circulating in the first cooling circuit while bypassing the radiator, heat loss to the environment during cold conditions is reduced. Instead the heat can be diverted towards increasing a temperature at the CAC rapidly. This allows for EGR to be scheduled earlier (as compared to engine cold-starts where the AC system is not engaged for defrosting or cabin cooling). As such, this extends EGR benefits over a wider range of engine operating conditions. An example use of defrost heating for warming a CAC is depicted herein with reference to FIG. 4.

Figure 3:
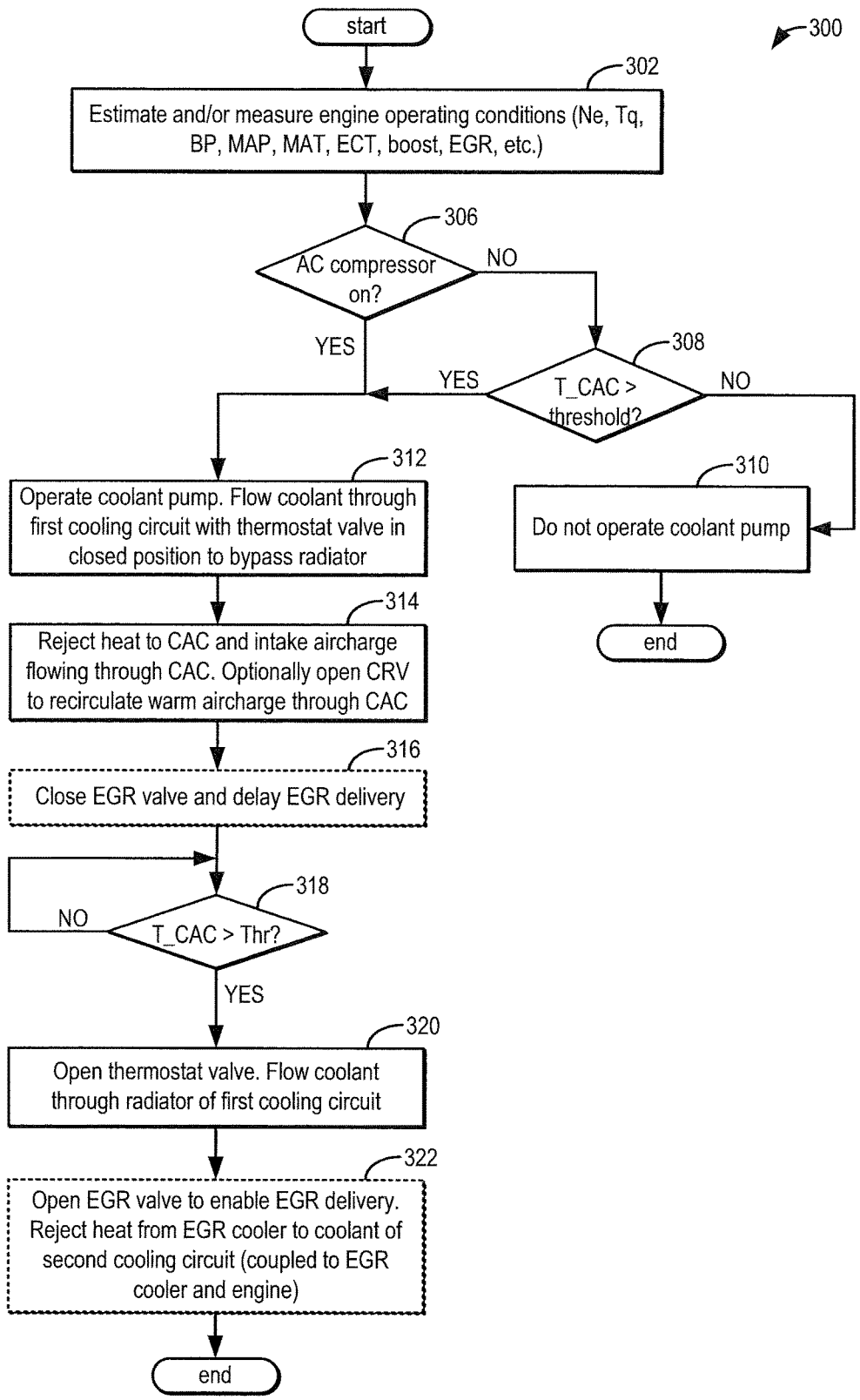
FIG. 3 shows a high level flow chart illustrating a routine that may be implemented for using defrost heating to expedite CAC warm-up and cooled EGR delivery.

While the example of FIG. 3 shows the opportunistic use of defrost heating to expedite CAC warming, it will be appreciated that during other cold conditions, when defrost heating is not available (such as when the AC system is not engaged due to an operator neither requesting cabin cooling or defrosting), the controller may used compressive heating to expedite CAC warm-up. The controller may simultaneously delay EGR valve opening until the CAC is sufficiently warm. Also, the controller may open the CRV to increase recirculation of heated aircharge across the compressor to further expedite CAC and engine warm-up during cold conditions (e.g., a cold-start).

As an example, during cold conditions when an air conditioning system is engaged, the controller may reject heat from the air conditioning system to a charge air cooler (that is, use defrost heating to warm the CAC) while during cold conditions when the air conditioning system is not engaged, the controller may reject heat from an exhaust system to the charge air cooler. As such, during both cold conditions, exhaust gas recirculation is delayed until a charge air cooler temperature (or coolant temperature or compressor temperature) is higher than a threshold. Delaying exhaust gas recirculation includes holding an EGR valve closed, the exhaust gas recirculation including low pressure exhaust gas recirculation from downstream of a turbine to a compressor inlet. As used herein, the cold conditions may include one or more of cold ambient conditions with ambient temperature below a threshold, cold engine conditions with engine coolant temperature below a threshold, and cold charge air cooler conditions with cooler temperature below a threshold.

Rejecting heat from the air conditioning system to the charge air cooler may comprise operating a coolant pump and flowing coolant through the air conditioning system and the charge air cooler with a thermostat valve in a closed position to bypass coolant around a radiator. In comparison, rejecting heat from the exhaust system to the charge air cooler may comprise closing an EGR valve and a wastegate coupled across the turbine while opening a compressor recirculation valve coupled across a compressor, the charge air cooler coupled downstream of the compressor. However, during both cold conditions, a compressor recirculation valve is opened to increase recirculation of warmed intake aircharge across an intake compressor.

Figure 4:
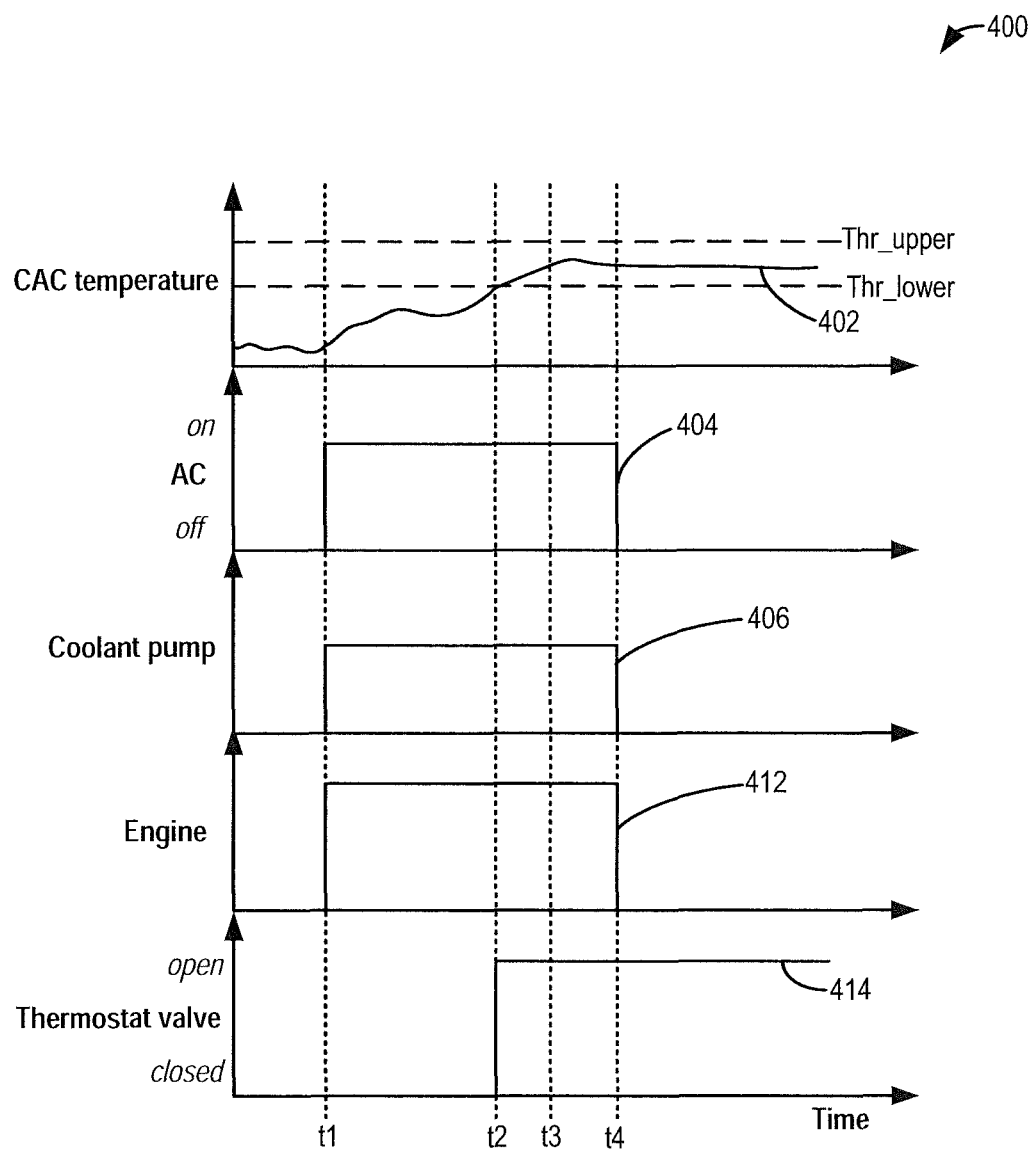
FIG. 4 shows an example adjustment used for CAC temperature control, according to the present disclosure.

Now turning to FIG. 4, map 400 depicts an example use of defrost heating for warming up a CAC. Map 400 depicts CAC temperature at plot 402, status of an AC system at plot 404, coolant pump operation at plot 406, engine operation at plot 412, and the status of a thermostat valve coupled to a first cooling circuit (including the coolant pump, the CAC, the AC system, and a radiator) at plot 414.

Prior to t1, the engine may be shutdown. At t1, an engine cold-start may be confirmed (plot 412). During the cold-start, CAC temperature (plot 402) may be below a lower threshold (Thr_lower) and the propensity for condensation and related issues may be high. Thus, if any EGR were demanded at t1, the delivery of EGR would be delayed until the CAC was sufficiently warmed.

Also at t1, due to the cold conditions, vehicle defrosting may be requested by the vehicle operator. In response to the vehicle defrost conditions, the AC system may be engaged at t1 (plot 404). As the AC system operates to dehumidify the cabin air, heat is generated at the AC system condenser which is rejected into coolant of a cooling circuit coupled to the AC system by operating a coolant pump (plot 406). During the cold CAC conditions, a thermostat valve coupled to the cooling circuit of the CAC is held closed (plot 414). By closing the valve, flow of coolant through a radiator is stopped. Instead, coolant is forced to flow through a bypass such that heat loss to the atmosphere is reduced. By using the thermostat valve, this heat is opportunistically used to expedite CAC warming. Specifically, defrost heating of the intake aircharge can be enabled.

Defrost heating of the intake aircharge and CAC may be continued for a duration between t1 and t2 until the CAC temperature is above Thr_lower. In one example, Thr_lower may be based on ambient conditions such as ambient temperature and humidity. In another example, Thr_lower may be a predefined value, such as 25-30° C.

At t2, in response to CAC temperature being at or above Thr_lower, EGR delivery may be enabled. As EGR delivery is initiated, heat may be rejected from the EGR cooler into a second cooling circuit coupled to the EGR cooler and the engine, but not coupled to the CAC. This allows engine temperatures to be raised during the cold-start, improving engine performance and fuel economy.

Also at t2, the higher coolant temperature may cause the thermostat valve to open. This allows coolant to be pumped by the coolant pump through a radiator. As coolant flows through the radiator, heat is lost to the environment, allowing for temperature control of the coolant.

Between t3 and t4, the CAC temperature may move towards an upper threshold temperature (Thr_upper) and temperature control of the CAC may be performed. The upper threshold temperature may be higher than the lower threshold temperature. Specifically, in response to elevated CAC temperatures, coolant pump operation may be adjusted, for example, a flow rate may be increased, so that flow of hot coolant through a radiator coupled to the first cooling circuit is increased. The flow rate may remain adjusted returned to maintain the CAC temperature below Thr_upper (and above Thr_lower). As such, the coolant pump may continue to be operated and adjusted for temperature control as long as the AC system is engaged At t4, the engine may be shutdown in response to engine shutdown conditions.

It will be appreciated that while the example of FIG. 4 suggests delaying EGR delivery until the CAC is warmed, the overall EGR schedule is enabled earlier in an engine cycle relative to an engine cycle where AC system heat is rejected via a radiator to the environment. Specifically, the defrost heating allows for EGR to be scheduled earlier in an engine cycle by expediting CAC heating.

It will also be appreciated that due to the specific coupling of the air conditioning system condenser, during cold-start conditions when the air conditioning system is not operated (such as when there is no operator request for cabin cooling or defrosting), compressive heating may be used to warm the CAC. Therein, a wastegate may be closed and heat rejection resulting from the exhaust backpressure may add sufficient heat to the coolant (which also recirculates through the CAC) to warm the CAC and reduce the propensity for CAC condensation. Therefore, exhaust recovery via increased compressor recirculation and EGR may be enabled during those conditions.

In one example, a vehicle system comprises an engine including an intake throttle, a turbocharger including an intake compressor and an exhaust turbine, a charge air cooler coupled downstream of the compressor and upstream of the throttle, and an EGR valve in an EGR passage coupling an outlet of the turbine to the compressor inlet, the EGR passage including an EGR cooler upstream of the EGR valve. The vehicle system further includes an air conditioning system for cooling cabin air based on operator demand and a first cooling circuit coupled to the charge air cooler, the air conditioning system, and a radiator. A thermostat valve may be located in the first cooling circuit. A second, different cooling circuit may be coupled to the engine and the EGR cooler. A controller may be configured with computer-readable instructions for, when the air conditioning system is engaged and a coolant temperature of coolant in the first cooling circuit is below a threshold temperature, flowing coolant through the first coolant circuit with the thermostat valve in a closed position to bypass coolant flow around the radiator. Then, after the coolant temperature is above the threshold temperature, the controller may flow coolant through the first coolant circuit with the thermostat valve in an open position to flow coolant through the radiator. As such, when the coolant temperature is below the threshold temperature, the controller may operate the engine with the EGR valve closed while after the coolant temperature is above the threshold temperature, the controller may open the EGR valve to enable exhaust gas recirculation while increasing exhaust heat rejection to the second cooling circuit.

In this way, during cold conditions, CAC heating can be expedited by opportunistically using heat rejected by an engaged AC system to warm the CAC. By diverting the heat away from a radiator to reduce heat loss to the environment, more heat can be rejected to coolant in a CAC cooling circuit. This allows defrost heating to be used to warm intake aircharge flowing through the CAC. By concurrently opening a CRV, increased recirculation of heated aircharge across the compressor can be used to further expedite CAC heating. By expediting warming of the CAC, and coordinating EGR delivery based on the CAC warming, EGR can be introduced with a reduced propensity for post-CAC condensation. As such, this allows EGR benefits to be attained even during cold ambient conditions and extends the EGR benefits over a wider range of engine operating conditions. By reducing the risk of condensation, misfires and related NVH issues can be reduced. Also, the warmed engine increases the efficiency of vehicle defrosting and cabin heating, improving passenger comfort during cold ambient conditions. Overall, engine performance during cold conditions is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a vehicle defrost condition including a temperature of coolant in a first cooling circuit being lower than a threshold, engaging an air conditioning system and rejecting heat from the air conditioning system into the first cooling circuit while bypassing a radiator with a thermostat valve coupled between the air conditioning system and the radiator is in a closed position, the first cooling circuit coupled to the air conditioning system, a charge air cooler, and the radiator, but not coupled to the engine.

2. The method of claim 1, wherein rejecting heat into the first cooling circuit while bypassing the radiator includes operating a coolant pump of the first cooling circuit to flow coolant through the air conditioning system and the charge air cooler via a bypass not including the radiator.

3. The method of claim 2, wherein heat is transferred from the air conditioning system to the charge air cooler via the coolant and from the charge air cooler to engine intake aircharge during engine operation.

4. The method of claim 3, further comprising, while rejecting heat into the first cooling circuit, opening a compressor recirculation valve coupled across an intake compressor to recirculate heated intake aircharge across the compressor.

5. The method of claim 4, further comprising, when coolant temperature is above the threshold, rejecting heat from the air conditioning system to atmosphere.

6. The method of claim 5, wherein when coolant temperature is above the threshold, the thermostat valve is in an open position.

7. The method of claim 6, wherein rejecting heat from the air conditioning system to atmosphere comprises operating the coolant pump to flow coolant through the air conditioning system, the charge air cooler, and the radiator.

8. The method of claim 7, further comprising, during the vehicle defrost condition, holding an EGR valve closed until the coolant temperature is above the threshold.

9. The method of claim 8, wherein the EGR valve is coupled downstream of an EGR cooler in a low pressure EGR passage, the EGR cooler coupled to a second, different cooling circuit including the engine, the second cooling circuit not including the air conditioning system.

10. The method of claim 9, further comprising, when the coolant temperature reaches the threshold, opening the EGR valve to recirculate exhaust gas from an engine exhaust to an engine intake via the EGR passage, and rejecting heat from the EGR cooler into the second cooling circuit to warm the engine.

11. The method of claim 10, wherein the threshold is based on one or more of ambient humidity, ambient temperature, and charge air cooler temperature.

12. A vehicle system, comprising:
an engine including an intake throttle;
a turbocharger including an intake compressor and an exhaust turbine;
a charge air cooler coupled downstream of the compressor and upstream of the throttle;
an air conditioning system for cooling cabin air based on operator demand;
a first cooling circuit coupled to the charge air cooler, the air conditioning system, and a radiator;
a thermostat valve in the first cooling circuit; and
a controller with computer-readable instructions for:
when the air conditioning system is engaged and a coolant temperature of coolant in the first cooling circuit is below a threshold temperature, flowing coolant through the first coolant circuit with the thermostat valve in a closed position to bypass coolant flow around the radiator.

13. The system of claim 12, wherein the controller includes further instructions for:
after the coolant temperature is above the threshold temperature, flowing coolant through the first coolant circuit with the thermostat valve in an open position to flow coolant through the radiator.

14. The system of claim 13, further comprising:
an EGR valve in an EGR passage coupling an outlet of the turbine to a compressor inlet, the EGR passage including an EGR cooler upstream of the EGR valve; and
a second, different cooling circuit coupled to the engine and the EGR cooler;
wherein the controller includes further instructions for:
when the coolant temperature is below the threshold temperature, operating the engine with the EGR valve closed; and
after the coolant temperature is above the threshold temperature, opening the EGR valve to enable exhaust gas recirculation while increasing exhaust heat rejection to the second cooling circuit.

15. An engine method, comprising:
during cold conditions when an air conditioning system is engaged, rejecting heat from the air conditioning system to a charge air cooler,
during cold conditions when the air conditioning system is not engaged, rejecting heat from an exhaust system to the charge air cooler; and
during both cold conditions, delaying exhaust gas recirculation until a charge air cooler temperature is higher than a threshold, and wherein the cold conditions include one or more of cold ambient conditions with ambient temperature below a threshold, cold engine conditions with engine coolant temperature below a threshold, and cold charge air cooler conditions with charge air cooler temperature below a threshold.

16. The method of claim 15, wherein rejecting heat from the air conditioning system to the charge air cooler comprises operating a coolant pump and flowing coolant through the air conditioning system and the charge air cooler with a thermostat valve in a closed position to bypass coolant around a radiator, and wherein rejecting heat from the exhaust system to the charge air cooler comprises closing an EGR valve and a wastegate coupled across a turbine while opening a compressor recirculation valve coupled across a compressor, the charge air cooler coupled downstream of the compressor.

17. The method of claim 16, wherein delaying exhaust gas recirculation includes holding the EGR valve closed, the exhaust gas recirculation including low pressure exhaust gas recirculation from downstream of the turbine to a compressor inlet.

18. The method of claim 17, further comprising, during both cold conditions, opening the compressor recirculation valve to increase recirculation of warmed intake aircharge across an intake compressor.

* * * * *